United States Patent
Fujisawa et al.

(10) Patent No.: US 8,630,347 B2
(45) Date of Patent: Jan. 14, 2014

(54) VIDEO DECODING APPARATUS AND VIDEO DECODING METHOD

(75) Inventors: Tatsuro Fujisawa, Ome (JP); Yoshihiro Kikuchi, Ome (JP); Yuji Kawashima, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1835 days.

(21) Appl. No.: 11/711,024

(22) Filed: Feb. 27, 2007

(65) Prior Publication Data

US 2007/0223585 A1 Sep. 27, 2007

(30) Foreign Application Priority Data

Feb. 28, 2006 (JP) ................. 2006-053838

(51) Int. Cl.
  *H04N 7/12* (2006.01)
  *H04N 11/02* (2006.01)
  *H04N 11/04* (2006.01)

(52) U.S. Cl.
  USPC ............ 375/240.15; 375/240.12; 375/240.13; 375/240.25; 375/240.26

(58) Field of Classification Search
  USPC .................................................... 375/240.15
  See application file for complete search history.

(56) References Cited

U.S. PATENT DOCUMENTS

| | | | | |
|---|---|---|---|---|
| 5,748,243 | A * | 5/1998 | Suzuki ...................... | 375/240.03 |
| 6,389,071 | B1 | 5/2002 | Wilson | |
| 6,393,393 | B1 * | 5/2002 | Kawahara ...................... | 704/229 |
| 7,310,371 | B2 * | 12/2007 | Cote et al. ................. | 375/240.15 |
| 2003/0206587 | A1 * | 11/2003 | Gomila .................... | 375/240.12 |

FOREIGN PATENT DOCUMENTS

| | | |
|---|---|---|
| JP | 11-239352 | 8/1999 |
| JP | 2005-20771 | 1/2005 |
| JP | 2005-57750 | 3/2005 |

OTHER PUBLICATIONS

Mattavelli, Marco, and Sylvain Brunetton. "Implementing Real-Time Video Decoding on Multimedia Processors by Complexity Prediction Techniques." IEEE Transactions on Consumer Electronics, vol. 44, No. 3, Aug. 1998.*
Notice of Reasons for Rejection mailed by the Japanese Patent Office on Jun. 1, 2010, for counterpart Japanese Patent Application No. 2006-053838, and English translation thereof (6 pages).
ITU-T Recommendation H.264(Mar. 2005), "Advanced video coding for generic audiovisual services", title page and pp. 181-196.
ISO/IEC 14496-10:2003, "Information technology, Coding of audio-visual objects—Part 10: Advanced video Coding".
H.264/AVC Textbook (Impress Communications Corporation) (2004), title and copyright pages and pp. 82-176.
U.S. Appl. No. 11/645,570, filed Dec. 27, 2006 (36 pages).
Response filed in U.S. Appl. No. 11/645,570 on Aug. 8, 2011 (10 pages).

* cited by examiner

*Primary Examiner* — Taghi Arani
*Assistant Examiner* — Narciso Victoria
(74) *Attorney, Agent, or Firm* — Finnegan, Henderson, Farabow, Garrett & Dunner, LLP

(57) ABSTRACT

According to one embodiment, a video decoding apparatus decoding a video stream selectively generates one of an intra prediction image and an inter prediction image based on an encoding mode of a decoding object from the video stream and decoded images thereof, generates a residual decoded image based on a quantization parameter of a decoding object from the video stream, generates a decoded image by adding one of an intra prediction image and an inter prediction image selectively generated, and the residual decoded image, applies deblocking filter process for reducing a block distortion onto the decoded image, extracts information on an encoding mode from the video image stream to determine whether or not inter prediction processes for generating the inter prediction image should be simplified, and simplifies the inter prediction process step-by-step on the basis of the result of the determination.

10 Claims, 12 Drawing Sheets

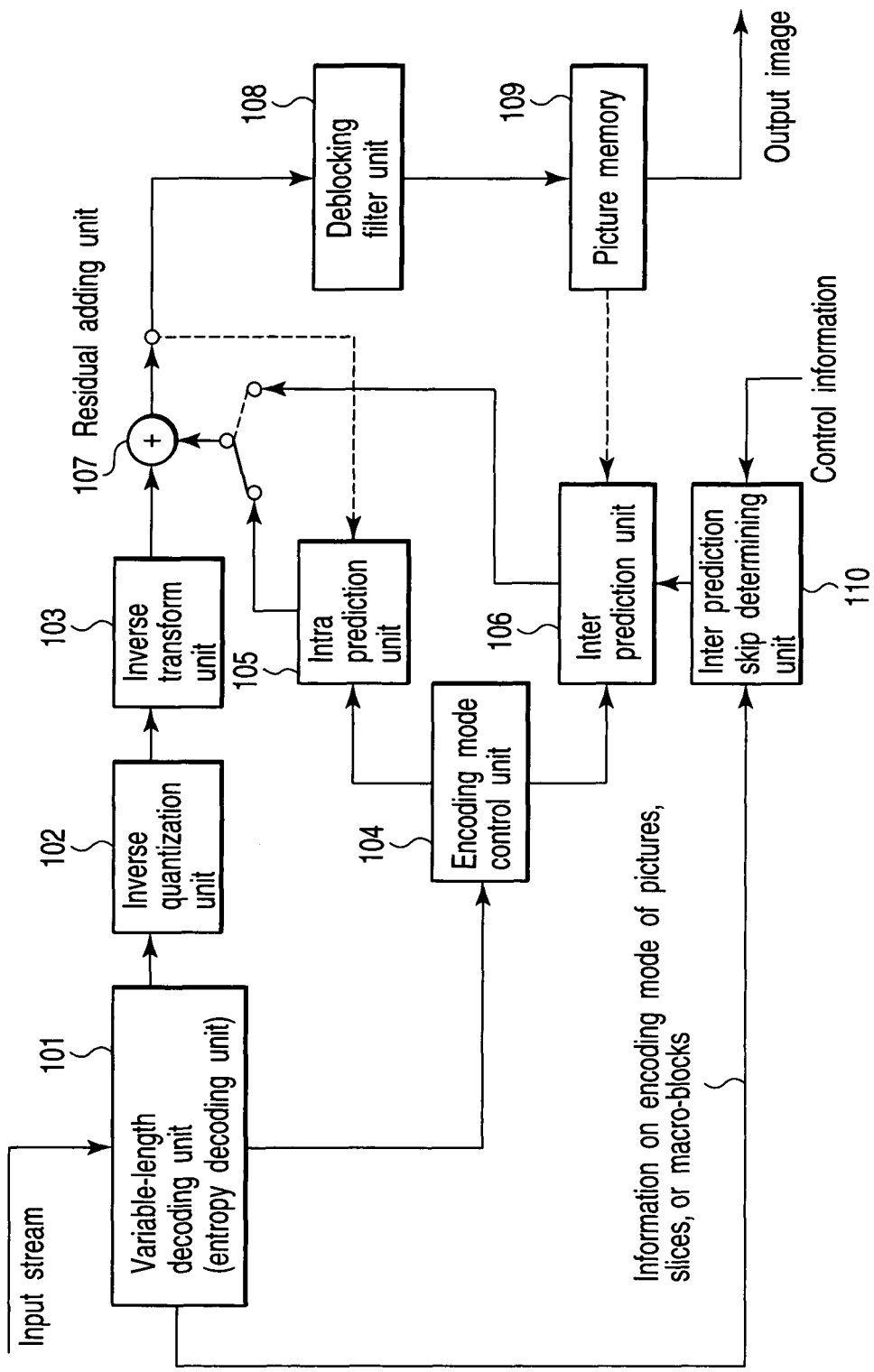
F I G. 1

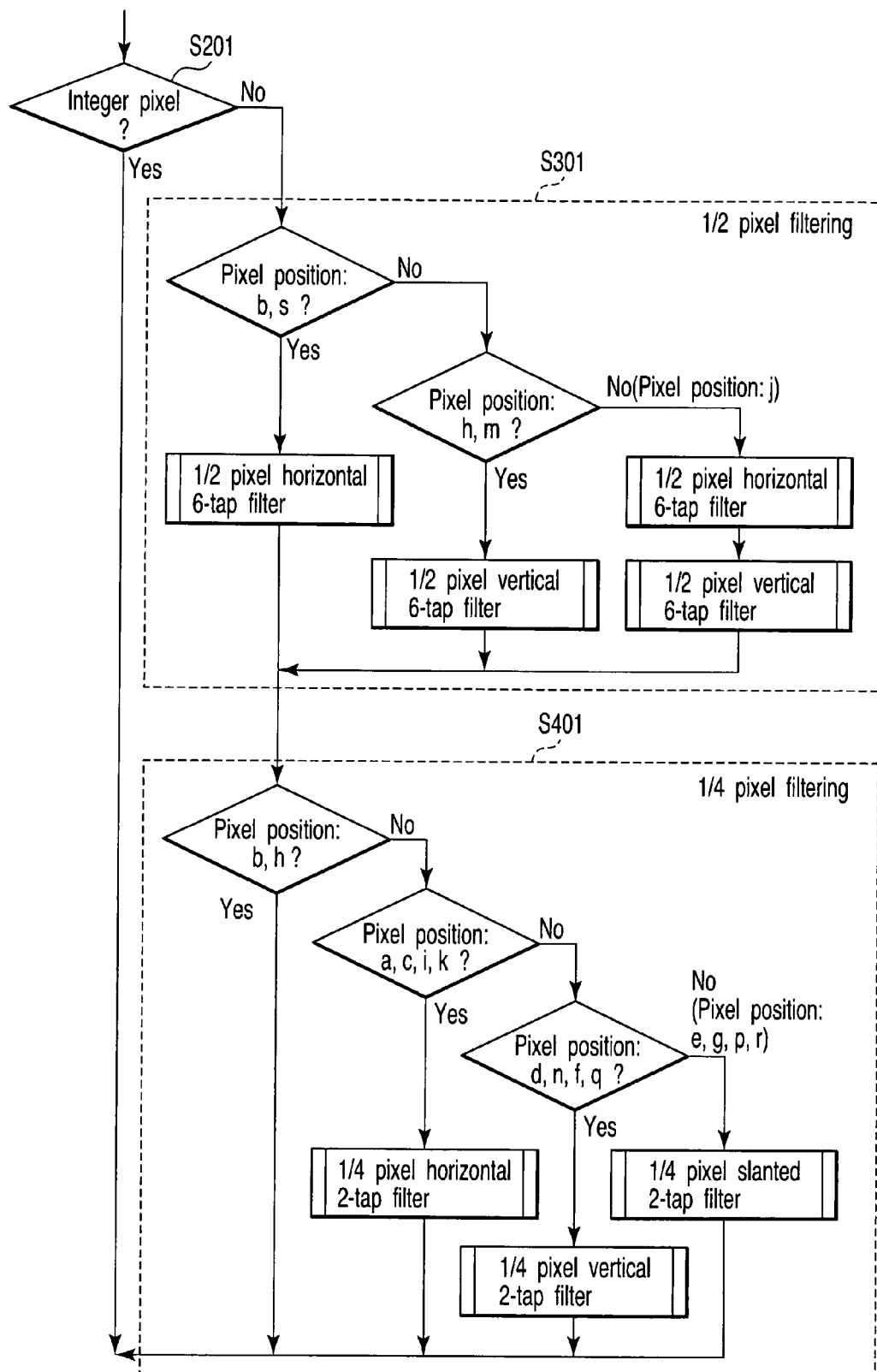
F I G. 10

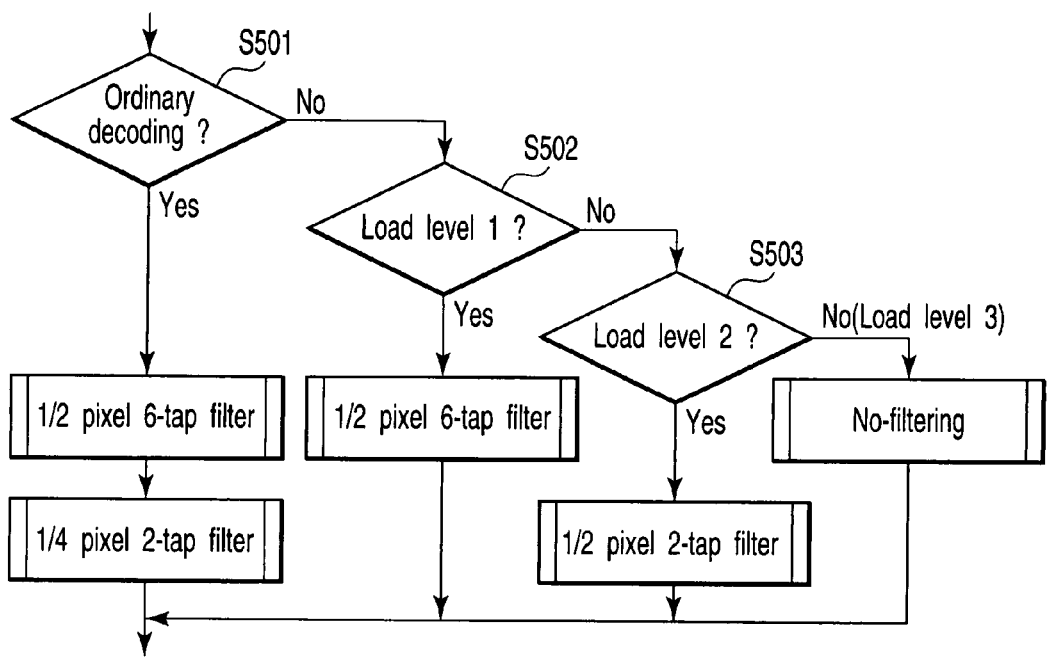
F I G. 11
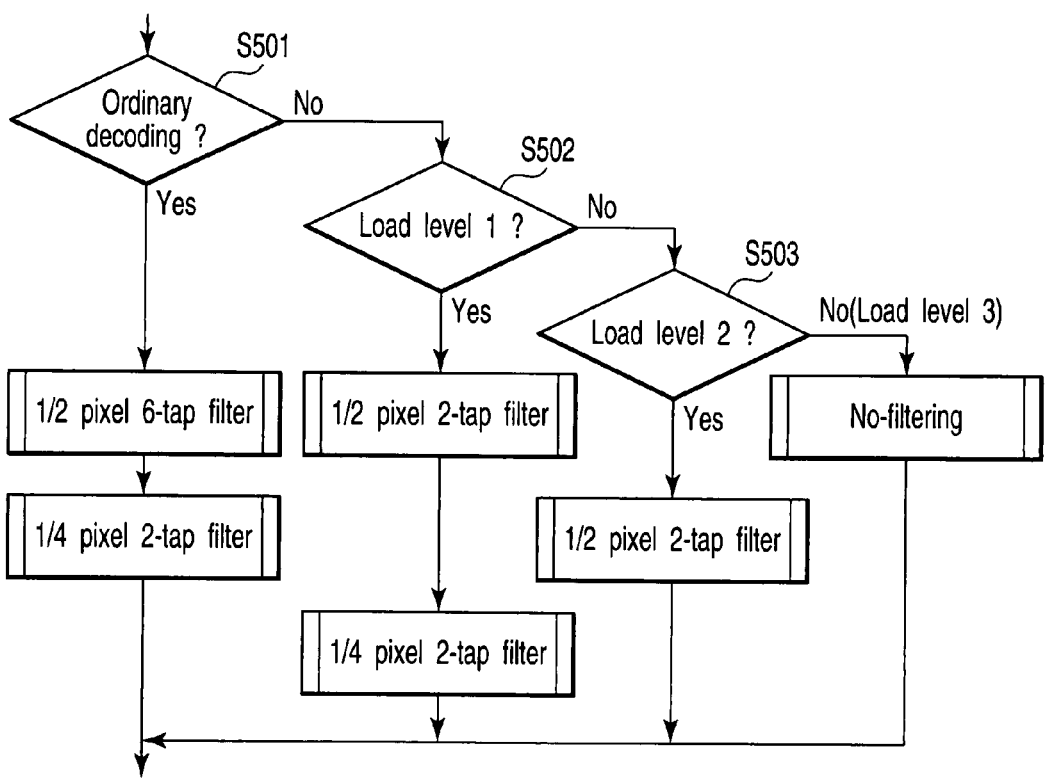
F I G. 12

VIDEO DECODING APPARATUS AND VIDEO
DECODING METHOD

CROSS-REFERENCE TO RELATED APPLICATIONS

This application is based upon and claims the benefit of priority from Japanese Patent Application No. 2006-053838, filed Feb. 28, 2006, the entire contents of which are incorporated herein by reference.

BACKGROUND

1. Field

One embodiment of the invention relates to a video decoding apparatus and a video decoding method which decodes a video stream which has been compressed and encoded.

2. Description of the Related Art

As standard technologies for encoding a video stream, H.261 and H.263 of the International Telecommunication Union Telecommunication Standardization Sector (ITU-T), Moving Picture Experts Group (MPEG)-1, MPEG-2, and MPEG-4 of the International Organization for Standardization (ISO), and the like, have been developed. As a next-generation video encoding method in which the technologies such as H.261 to H.263, MPEG-1 to MPEG-4, and the like have been succeeded, and further developed, there is the H.264 which has been standardized by the ISO and the ITU jointly (refer to ITU-T Recommendation H.264 (2003), "Advanced Video Coding for generic audiovisual services" | ISO/IEC 14496-10: 2003, "Information technology, Coding of audio-visual objects—Part 10: Advanced video coding", and H.264/AVC textbook (Impress Communications Corporation)).

However, the H.264 accomplishes high compressibility and yet produces a problem that its processing amount is large. In particular, reproducing a video with high compressibility from a medium, such as an HD-DVD, requires a high arithmetic processing capability, so that it causes serious problems. Specifically, in a video decoding apparatus with such standardization specifications based on the H.264, compensating movements of inter predictions accounting to the whole of decoding processing being large in quantity, there is a possibility that such a disadvantage occurs that decoding processing in real time cannot be made in time, frames are missed, and movements of objects are extremely become slow, if the load on the whole of the decoding apparatus is heavy.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

FIG. 1 is a block diagram showing a structural example when the present invention is applied to a video decoding apparatus in accordance with standardization specifications based on the H.264, as one embodiment of a video decoding apparatus according to the present embodiment;

FIG. 10 is a flowchart showing a processing procedure of a determination process of integer pixels (S301), ½ pixel filtering process, and ¼ pixel filtering process, as an ordinary decoding process for the processing contents shown in FIG. 9;

FIG. 11 is a flowchart showing a first embodiment in decreasing filtering processes and the number of taps in response to load levels for the ordinary decoding process in FIG. 10;

FIG. 12 is a flowchart showing a second example in decreasing the filtering processes and the number of the taps in response to load levels for the ordinary decoding process in FIG. 10.

DETAILED DESCRIPTION

Figure 2:
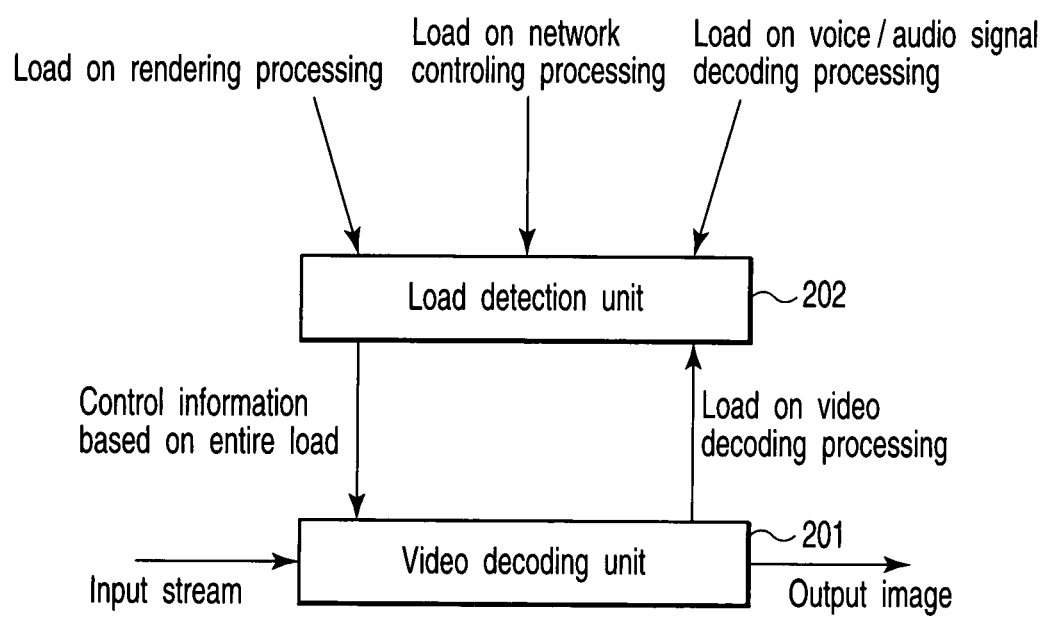
FIG. 2 is a block diagram showing a structural example of a content information processing system including the video decoding apparatus shown in FIG. 1 as a video decoding unit.

Various embodiments according to the invention will be described hereinafter with reference to the accompanying drawings. In general, according to one embodiment of the invention, a video decoding apparatus decoding a video stream which has been compressed and encoded, comprises: a prediction decoding unit which selectively generates one of an intra prediction image and an inter prediction image based on an encoding mode of a decoding object from the video stream and decoded images thereof; a residual decoding unit which generates a residual decoded image based on a quantization parameter of a decoding object from the video stream; an adding unit which generates a decoded image by adding one of an intra prediction image and an inter prediction image selectively generated by the prediction decoding unit, and a residual decoded image generated by the residual decoding unit; a filter process unit which applies deblocking filter process for reducing a block distortion onto a decoded image generated by the adding unit; a determining unit which extracts information on an encoding mode from the video stream to determine whether or not inter prediction processes for generating the inter prediction image should be simplified on the basis of the extracted information; and a simplifying unit which simplifies the inter prediction processes step-by-step on the basis of a result of determination from the determining unit.

Hereinafter, embodiments of the present invention will be described with reference to the drawings.

FIG. 1 is a block diagram showing a structural example when the present invention is applied to a video decoding apparatus in accordance with standardization specifications based on the H.264, as one embodiment of a video decoding apparatus relating to the present invention. In FIG. 1, an input stream is a video stream which has been compressed and encoded in accordance with the H.264 standard, and is transmitted to a variable-length decoding unit (called an entropy decoding unit as well) 101. The variable-length decoding unit 101 encodes an input stream so as to be a varying length, and generates syntax. An inverse quantization unit 102 and an inverse transform unit 103 generate a residual image from a result of encoding of a video encoded stream based on the generated syntax.

An encoding mode control unit 104 discriminates an encoding mode based on the input stream from the variable-length decoding unit 101, and selectively controls to drive a intra prediction unit 105 and a inter prediction unit 106 based on a result of discrimination. The intra prediction unit 105 and the inter prediction unit 106 respectively generate predicted images in a screen and between screens in accordance with an encoding mode designated by the encoding mode control unit 104. Generated predicted images are selectively transmitted to a residual adding unit 107. The residual adding unit 107 adds a predicted image from the intra prediction unit 105 or the inter prediction unit 106, and a residual image from the inverse transform unit 103 to generate a decoded image. The generated decoded image is provided as a reference in the intra prediction unit 105.

The decoded images obtained from the residual adding unit 107 are transmitted to a deblocking filter unit 108, and reconstructed images are generated there by filter processing. The reconstructed images are stored in a picture memory (frame memory) 109 temporarily and output in turn to a display system, as a result of decoding.

An inter prediction skip determining unit 110 extracts information related to the encoding mode of pictures, slices or macro-blocks from the variable-length decoding unit 101 on the basis of the control information from a main control unit (not shown) to determine whether or not the prediction process in the inter prediction unit 106 should be skipped. Its determining method will be described later. Here, to perform a deblocking filtering process, the decoded images are input in the deblocking filter unit 108 to be conducted the deblocking filtering process for generating the reconstructed images, and the reconstructed images stored in the picture memory 109. If the deblocking filtering process is not performed, the decoded images are directly stored in the picture memory 109, as the reconstructed images. The reconstructed images stored in the picture memory 109 are output as output images and also referred in the inter prediction unit 106.

FIG. 2 shows a structural example of a content information processing system including the video decoding apparatus shown in FIG. 1 as a video decoding unit 201. This system further includes a load detection unit 202. The load detection unit 202 acquires information on processing load in video decoding processing from the video decoding unit 201 and information on the other processing load of the system in decoding processing for voice/audio signals, rendering processing, and the like. The load detection unit 202 calculates an entire load based on the input information on load and notifies the video decoding unit 201 of the information on load.

The information on the processing load is input to the inter prediction skip determining unit 110 in FIG. 1 in a load decoding unit 201.

It is presumed that the present embodiment detects loads of each process conducted in the whole of the decoding apparatus, and if the loads are heavy, decreases decoding process amounts by adaptively skipping processes at the inter prediction unit 106. However, skipping and simplifying the inter prediction processes without reserve deteriorates images extremely. Therefore, the decoding apparatus preferentially simplifies only the B pictures (B slices, bi-prediction portions) which especially increase processing amounts at the inter prediction unit 106 in response to encoding mode information of the pictures, slices or macro-blocks, then, decreases the processing amounts while suppressing the deterioration in image quality minimally.

Hereinafter, specific processing operations of the inter prediction skip determining unit 110 accomplishing the aforementioned processing with reference to FIG. 3 to FIG. 8.

Figure 3:
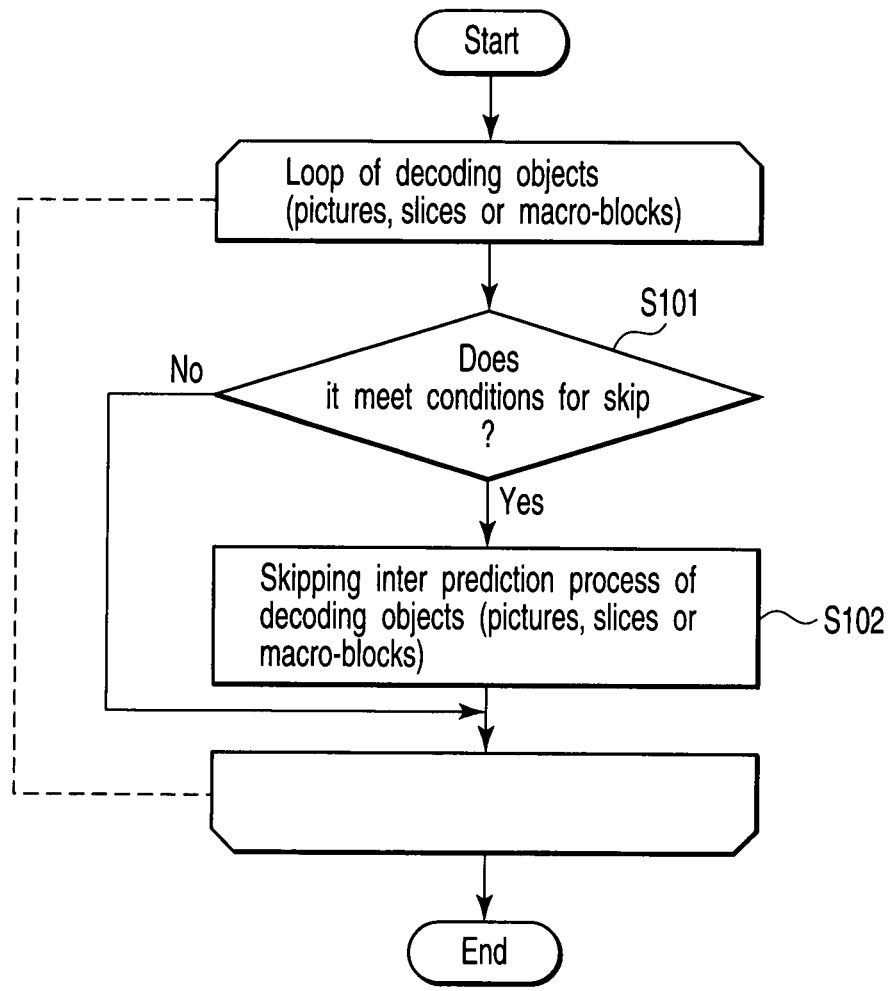
FIG. 3 is a flowchart showing a processing example for simply accomplishing skip determination in an inter prediction skip determining unit in FIG. 1.

FIG. 3 is a flowchart illustrating a processing procedure for simply accomplishing skip determination. In FIG. 3, when the loop processing of the decoding objects (pictures, slices or macro-blocks), the determining unit 110 determines whether or not the loop processing meets conditions for skip (S101). If it does not meet them, the determining unit 110 continues the loop processing as it is, and if it meets them, the determining unit 110 issues an instruction so as to skip the inter prediction process for the decoding objects (pictures, slices or macro-blocks) (S102).

Figure 4:
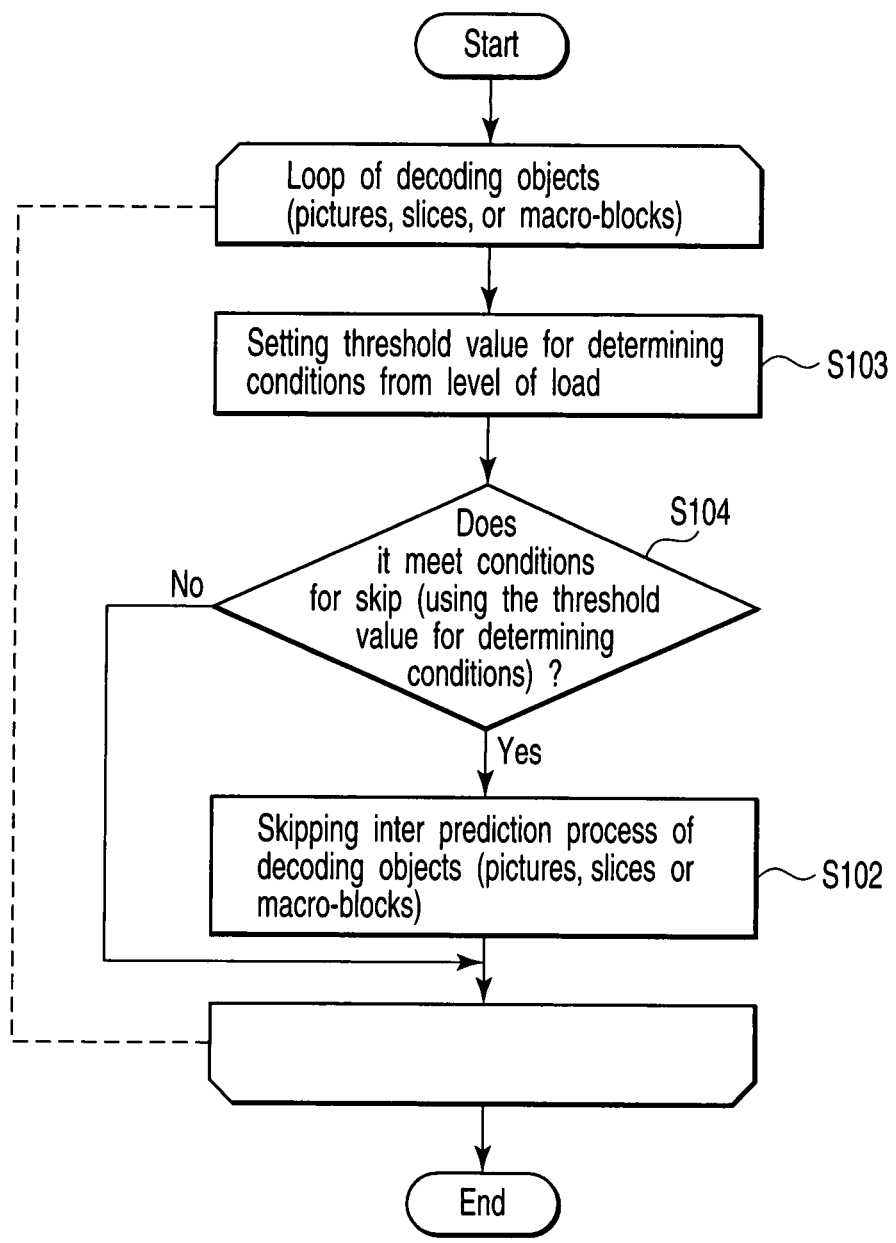
FIG. 4 is a flowchart showing a processing procedure appropriately performing skip determination by modifying the processing procedure shown in FIG. 3 in the inter prediction skip determining unit in FIG. 1.

FIG. 4 is a flowchart illustrating a processing procedure for appropriately performing skip determination by taking measures to the processing procedure shown in FIG. 3. Therefore, in FIG. 4, the same components as those of FIG. 3 are designated by the identical symbols and the components to be characteristics will be described hereinafter.

In FIG. 4, when the loop processing of the decoding objects (pictures, slices or macro-blocks) is started, the determining unit 101 sets a threshold value for determining conditions corresponding to the level of the load on the basis of the control information from the load detection unit 202 (S103), and determines whether or not the loop processing meets the conditions for skip by using the threshold value (S104).

Figure 5:
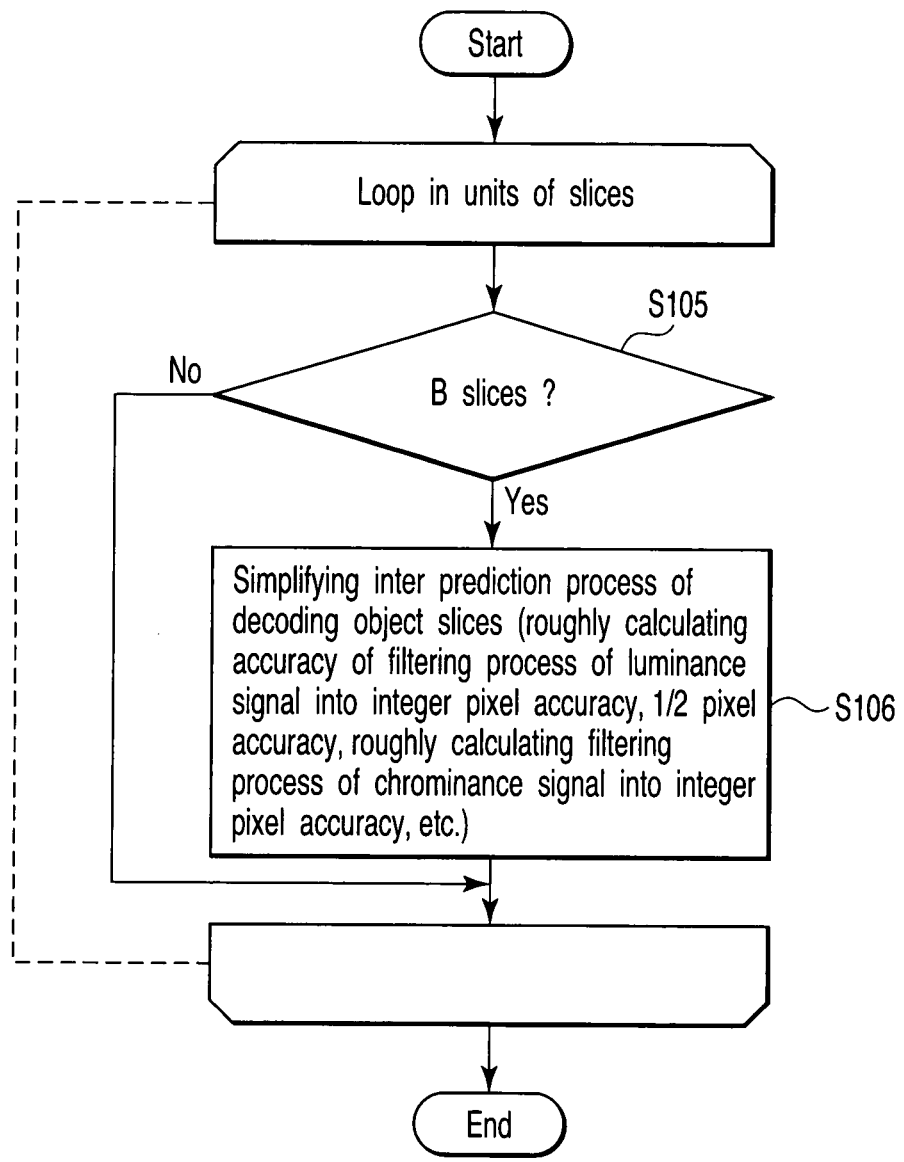
FIG. 5 is a flowchart showing a processing procedure of preferentially for simplifying only B slices of B pictures which especially increase processing amounts at an inter prediction unit when loop processing in units of slices is performed in the inter prediction skip determining unit in FIG. 1.

FIG. 5 is a flowchart illustrating a processing procedure for preferentially simplifying only B slices of the B pictures which specifically increases the processing amounts at the inter prediction unit when loop processing in units of slices is implemented. Also in FIG. 5, the same components as those of FIG. 3 are designated by identical symbols, and explanation of those components will be omitted hereinafter.

In FIG. 5, when the loop processing in units of slices is started, the determining unit 110 determines whether or not the decoding objects are B slices (S105). If they are not the B slices, the determining unit 110 continues the loop processing as it is. If they are the B slices, the inter prediction processing for the decoding object slices is simplified (S106). As for the method of simplifying, roughly calculating (approximating) interpolation filtering of a luminance signal in ¼ pixel accuracy into ½ pixel accuracy and integer pixel accuracy, or roughly calculating (approximating) interpolation filtering of a chrominance signal in ⅛ pixel accuracy into integer pixel accuracy is a possible approach.

Figure 6:
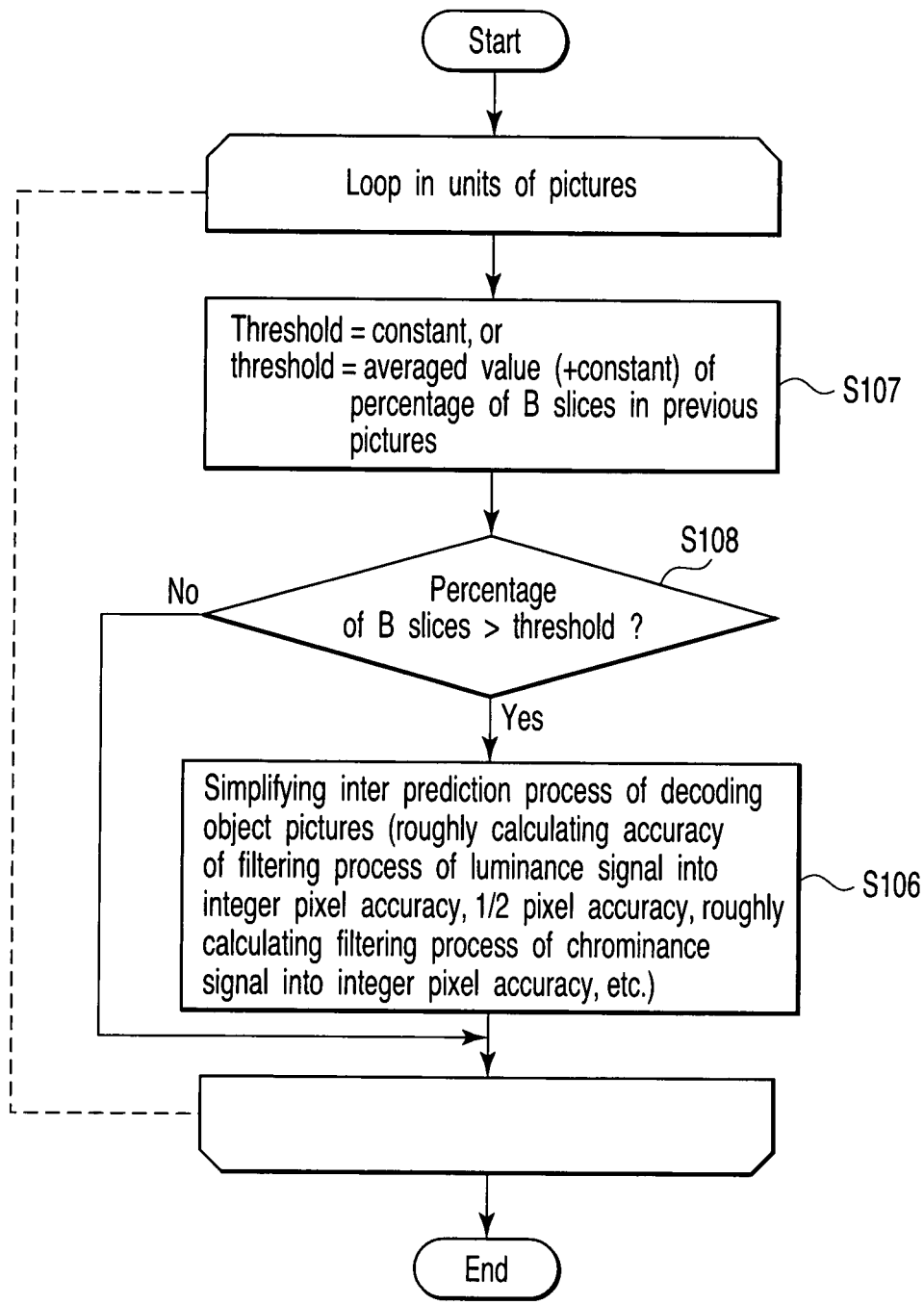
FIG. 6 is a flowchart showing a processing procedure which enables further appropriately simplifying the processing procedure shown in FIG. 5 by modifying the procedure when loop processing in units of pictures is performed in the inter prediction skip determining unit in FIG. 1.

FIG. 6 is a flowchart showing a processing procedure enabling the processing procedure shown in FIG. 5 to be simplified further accurately by modifying the procedure when the loop processing in units of pictures is implemented. Therefore, in FIG. 6, the same components as those of FIG. 3 and FIG. 7 are designated by identical symbols, and components to be characteristics will be described hereinafter.

In FIG. 6, when the loop processing in units of pictures is started, the determining unit 110 sets a threshold value=a constant, or an averaged value (adding a constant if necessary) of a percentage of the B slices of previous pictures from the levels of loads (S107), determines whether or not the percentage of the B slices exceeds the threshold value (S108). Only in the case of exceeding, the determining unit 110 simplifies the inter prediction processing of the pictures of the decoding objects (S106).

Figure 7:
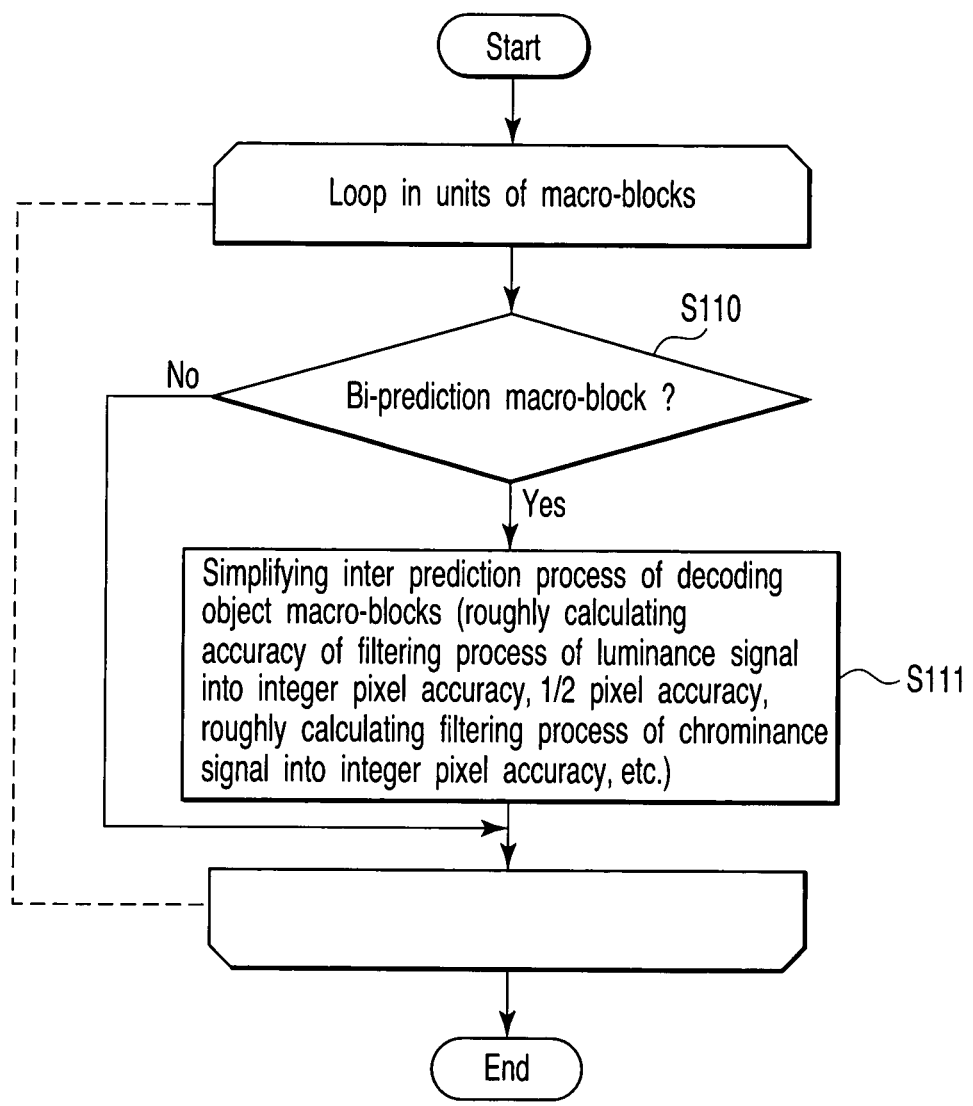
FIG. 7 is a flowchart showing a processing procedure of preferentially simplifying only bi-prediction portion of B pictures which especially increase processing amounts at an inter prediction unit when loop processing in units of macroblocks is performed in the inter prediction skip determining unit in FIG. 1.

FIG. 7 is a flowchart showing a processing procedure in preferentially simplifying only the bi-prediction portions of the B pictures which especially increase the processing amounts of the inter prediction unit when the loop processing is performed in units of macro-blocks. Also in FIG. 7, the same components as those of FIG. 3 are designated by identical symbols, and the explanation for those components will be omitted hereinafter.

In FIG. 7, when the loop processing in units of macro-blocks is started, it is determined whether or not the loop processing is for bi-prediction macro-blocks (S110). If it is not the bi-prediction macro-blocks, the loop processing is continued as it is. In the case of the bi-prediction macro-blocks, the determining unit 110 simplifies the inter prediction processing of the decoding object macro-blocks (S111). As for the method of simplifying, roughly calculating (approximating) interpolation filtering of a luminance signal in ¼ pixel accuracy into ½ pixel accuracy and integer pixel accuracy, or roughly calculating (approximating) interpolation filtering of a chrominance signal in ⅛ pixel accuracy into integer pixel accuracy is a possible approach.

Figure 8:
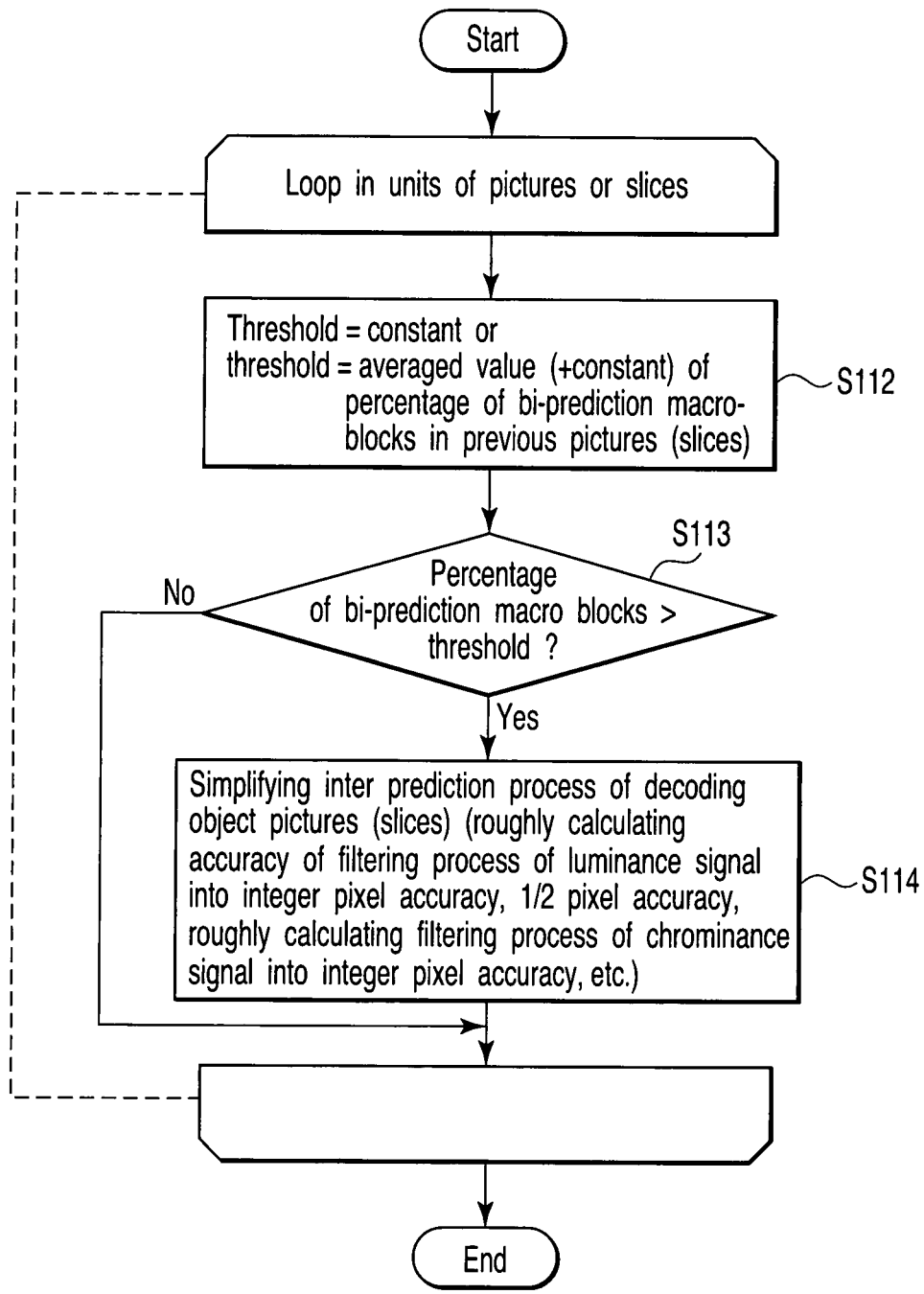
FIG. 8 is a flowchart showing a processing procedure which enables further appropriately simplifying the processing procedure shown in FIG. 5 by modifying the procedure when loop processing in units of pictures (slices) is performed in the inter prediction skip determining unit in FIG. 1.

FIG. 8 is a flowchart showing a processing procedure enabling the processing procedure shown in FIG. 7 to be simplified further accurately by modifying the procedure when the loop processing is implemented in units of pictures. In FIG. 8, therefore, the same components as those of FIG. 3 and FIG. 7 are designated by the identical symbols, the components to be characteristics will be described hereinafter.

In FIG. 8, when the loop processing in units of pictures (slices) is started, the determining unit 110 sets a threshold value=a constant, or an averaged value (adding a constant if necessary) of a percentage of the bi-prediction macro-blocks of previous pictures (slices) from the levels of loads (S112), determines whether or not the percentage of the bi-prediction macro-blocks exceeds the threshold value (S113), and simplifies the inter prediction processing of the pictures of the decoding objects only when the percentage exceeds the threshold value (S114).

According to the processing given above, when a processing reduction in inter prediction is required in a state of a heavy load, the determining unit 110 reduces only the spots in which the processing amounts are especially large at the inter prediction unit 106, such that only the B pictures (B slices, bi-prediction portions) which increase the processing amounts at the inter prediction unit 106 in response to information on the encoding mode of the pictures, slices and macro-blocks, so that it can reduce the processing amounts while suppressing the deterioration in image quality minimally.

(Embodiment)

Hereinafter, a method of a step-by-step simplification will be described specifically.

Simplification types are classified roughly into a process for interpolation filtering of a luminance signal and a process for that of a chrominance signal. The interpolation filtering of the luminance signal includes:

(1) Limit the number of steps of the interpolation filtering
(2) Reduce the number of taps of the filter
(3) Select one interpolation in either horizontal direction or vertical direction.

Finely controlling for the interpolation filtering of the chrominance signal not bringing a marked result, it is thought that controlling only by on/off is sufficient.

In particular, interpolation image generation of the a luminance signal of the inter prediction increases the processing amounts because it generates compensated images by use of filtering processing with six taps, and the processing amount occupies around ⅓ extent of entire decoding processes sometimes. Therefore, in the case of a heavy load, the decoding processing amounts are reduced by performing the inter prediction in a simple manner so as to reduce the decoding processing amounts. Depending on the degree of the load, the processes are reduced by switching step-by-step to a no-filtering process, a filtering process only with a ½ pixel filter, a filtering process with a small number of taps, etc. Hereinafter, the filtering processes will be mentioned by giving specific examples.

Figure 9:
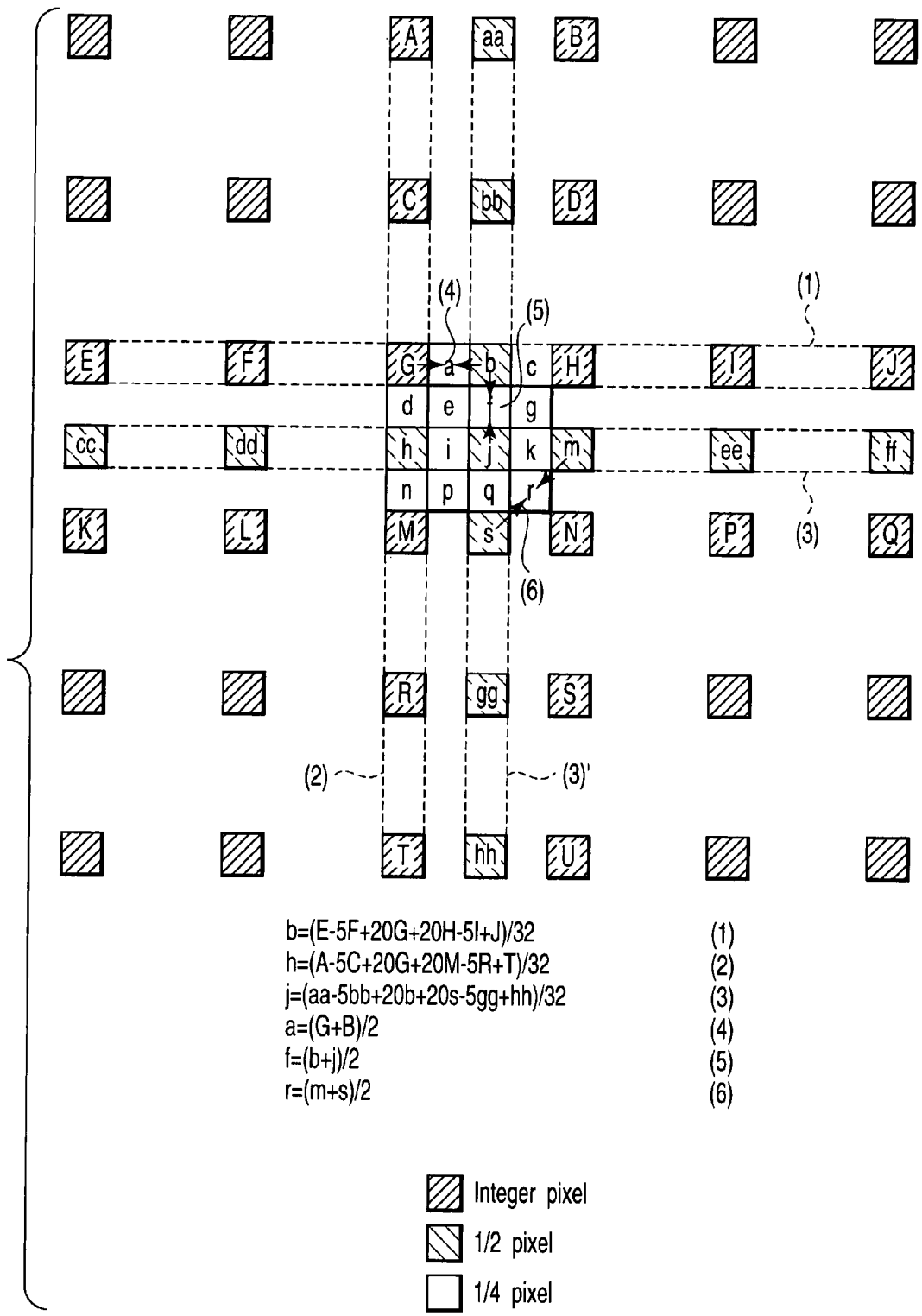
FIG. 9 is a schematic view showing an aspect of a filtering process in generating inter prediction signals.

FIG. 9 shows an aspect of filtering processing in the inter prediction signal generation. Provisional pixels b, h, m and s of either of which the horizontal direction or vertical direction is present at the ½ pixels, respectively, are generated from integer pixels (A, B, C, etc.) by applying direct ½ pixel filtering. A provisional pixel j of both of which horizontal and vertical directions are present at the ½ pixel generates provisional pixels aa, bb, cc, etc., from the integer pixel by applying the ½ pixel filtering, and further generates those pixels by applying the ½ pixel filtering. Provisional pixels a, c, e, f, g, etc., present at the positions of the ¼ pixels are generated by applying the ¼ pixel filtering to the integer pixels and ½ pixels. That is, the values of the provisional pixels b, h, j, a, f, and r are typically obtained by the following equations.

$$b=(E-5F+20G+20H-5I+J)/32 \quad (1)$$

$$h=(A-5C+20G+20M-5R+T)/32 \quad (2)$$

$$j=(aa-5bb+20b+20s-5gg+hh)/32 \quad (3)$$

$$a=(G+b)/2 \quad (4)$$

$$f=(b+j)/2 \quad (5)$$

$$r=(m+s)/2 \quad (6)$$

FIG. 10 is a flowchart illustrating a processing procedure of a determining process of an integer pixel (S201), a ½ pixel filtering process S301, and a ¼ pixel filtering process S401, as ordinary decoding processes to processing contents which will be shown in FIG. 12. In FIG. 10, at first, when it is determined that the pixel is not the integer pixel n the determining step thereof (S201), the ½ pixel filtering process S301 conducts processing by the use of the ½ pixel horizontal six taps filter for pixel positions present at b and s, by the use of the ½ pixel vertical six taps filter for pixel positions present at h and m, and by the use both ½ pixel horizontal and vertical six taps filters for pixel positions present at j.

Next, the ¼ pixel filtering S401 performs processes, without using any filter when the pixel positions are present at b, h and i, by using the ¼ pixel horizontal two taps filter when the pixel positions are present at a, c, i, and k, by using the ¼ pixel vertical two taps filter when the pixel positions are present at d, n, f, and q, and by using a ¼ pixel slanted two taps filter when the pixel positions are present at e, g, p, and r.

FIG. 11 is a flowchart showing a first embodiment when reducing the filtering processes and the number of taps in response to the load level to the foregoing ordinary decoding processes.

In FIG. 11, when it is determined that the processing is the ordinary decoding in a step S501, the ½ filtering processing and ¼ filtering process are performed through the ½ pixel six taps filter and ¼ pixel two taps filter, respectively. If it is determined that the load level is load level 1 in a step 502, the first embodiment skips only the ¼ pixel filtering process by using only the ½ pixel six taps filter (the same processing for ½ pixel). When it is determined that the load level is load level 2, the number of taps is decreased by the use of the ½ pixel two taps filter. Further, in the step 503, determination of the load lever as load level 3 skips the filtering process (the same processing for integer pixel).

FIG. 12 is a flowchart illustrating a second embodiment in the case of reducing filtering processes and the number of taps in response to load level to the aforementioned ordinary decoding processing. The second embodiment differs from the first embodiment in reducing the number of the taps by using the ½ pixel two taps filter and executing the ¼ filtering process by using the ¼ pixel two taps filter when the step S502 determines that the load level is the load level 1.

Figure 13:
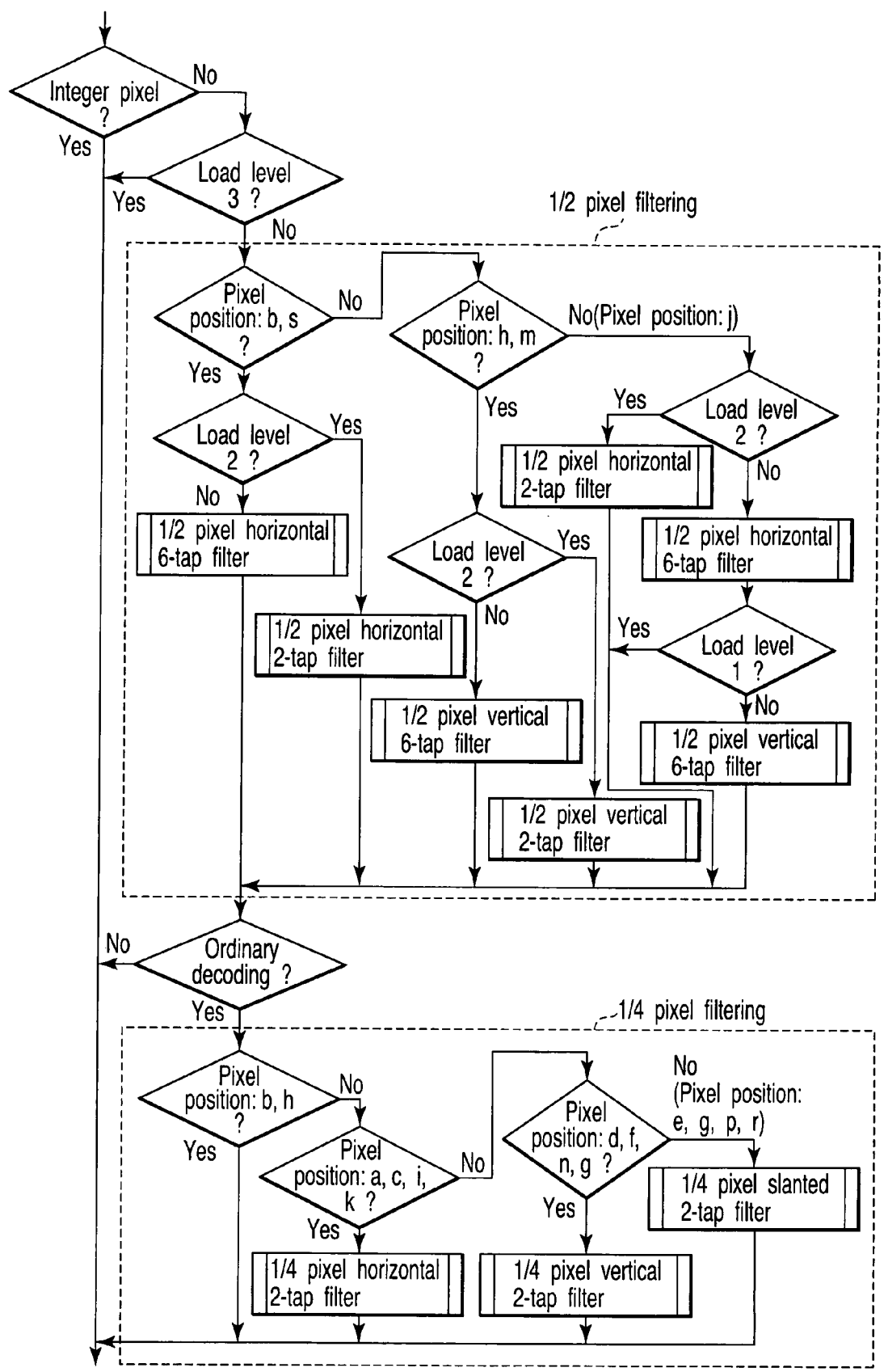
FIG. 13 is a flowchart showing a third example in decreasing the filtering processes and the number of the taps in response to load levels for the ordinary decoding process in FIG. 10.

FIG. 13 is a flowchart showing a third embodiment for reducing the filtering processes and the number of the taps in response to the load level to the foregoing ordinary decoding processing. The flowchart in this embodiment shows the processing procedure to skip filtering process in a vertical direction only for the pixel position j to which six taps filtering processing is applied twice in a horizontal/vertical direction among ½ pixel interpolations in the load level 1. The others going same as that of the first embodiment, the explanation for the others will be eliminated hereinafter. In the aforementioned embodiments, configuration examples which inputs a load level together with a motion vector in the inter prediction unit to decide interpolation filtering process to simplify itself in response to the load level in the inter prediction unit having described, roughly calculating the accuracy of the motion vector to be input to the inter prediction by the inter prediction skip determining unit also enables simplification in a similar manner.

For example, if it is determined that the load level is the load level 1, the third embodiment can skip the ¼ pixel filtering process like the case in which the load level is determined as the load level 1 in the step S502 in FIG. 11, by roughly calculating the accuracy of the motion vector into the ½ pixel accuracy. If the load level is determined as the load level 3, roughly calculating the accuracy of the motion vector into the integer pixel accuracy enables the filtering process to be skipped like the case in which the load level has determined as the load level 3 in the step S503 in FIG. 11.

If the accuracy of the motion vector is the ½ pixel accuracy both in the horizontal and vertical components, roughly calculating the accuracy of the vertical component into the integer pixel accuracy allows only the pixel position j to be skipped its filtering process in the vertical direction like the case in which the load level is determined to be the load level 1 in FIG. 12.

The Rough calculation of the motion vector of a chrominance signal into the integer pixel accuracy makes it possible to skip the interpolation filtering of the chrominance signal.

Thereby, without changing the configuration of the interpolation filtering process of the inter prediction, the interpolation filtering can be simplified. For instance, in performing the interpolation filtering process among a plurality of sets of hardware, roughly calculating in advance the accuracy of the motion vector necessary for the interpolation filtering enables simplifying the interpolation filtering without changing the contents of the hardware.

Applying the processing procedure given above enables appropriately reducing the filtering processes and the number of taps in the inter prediction processing in response to the load level to effectively reduce the computing amounts while suppressing the deterioration in image quality, and thereby, enables contributing to the reduction in load.

The present invention may be accomplished not only as the video decoding method mentioned above but also as a video decoding method including characteristic steps as means included in such a video decoding method. The invention may be also achieved as a program to make a computer execute these steps. Such a program can be distributed through a recording medium such as a CD-ROM and a transmission medium such as the Internet.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A video decoding apparatus for decoding a compression-encoded video stream, comprising:
    a prediction decoding unit which generates one of an intra prediction image and an inter prediction image from the video stream and decoded images thereof based on an encoding mode of an object to be decoded;
    a residual decoding unit which generates a residual decoded image from the video stream based on a quantization parameter of the object to be decoded;
    an adding unit which generates a decoded image by adding the one of an intra prediction image and an inter prediction image generated by the prediction decoding unit to the residual decoded image generated by the residual decoding unit;
    a filter process unit which applies at least a deblocking filter process for reducing a block distortion onto the decoded image generated by the adding unit;
    a determining unit which determines whether or not a current processing load is higher than a threshold value and which, if it is determined that the current processing load is higher than the threshold value, extracts information on an encoding mode from the video stream to determine, based on the extracted information, whether to simplify an inter prediction process for generating the inter prediction image; and
    a simplifying unit which gradually simplifies the inter prediction process based on a determination result of the determining unit, wherein
    the threshold value is an average value of objects to be decoded in decoded past pictures or slices, or a value obtained by adding an offset value to the average value, and wherein the object to be decoded uses percentages of B slices in loop processing in units of slices and of B slices in loop processing in units of pictures, and percentages of bi-prediction macro-blocks in loop processing in units of macro-blocks and of bi-prediction macro-blocks in loop processing in units of pictures or slices.

2. The video decoding apparatus according to claim 1, wherein the determining unit determines that the inter prediction process should be simplified from information on the encoding mode when the object to be decoded is one of a picture, a slice and a macro-block, and is in a state of a heavy load.

3. The video decoding apparatus according to claim 1, wherein the simplifying unit skips filtering processes step-by-step.

4. The video decoding apparatus according to claim 3, wherein the simplifying unit skips filtering process step-by-step by roughly calculating accuracy of a motion vector step-by step.

5. The video decoding apparatus according to claim 1, wherein the simplifying unit skips the number of taps of a pixel filter step-by-step.

6. The video decoding apparatus according to claim 1, wherein the simplifying unit skips one of a vertical pixel filtering process and a horizontal pixel filtering process.

7. The video decoding apparatus according to claim 6, wherein the simplifying unit skips one of the vertical pixel filtering process and the horizontal pixel filtering process by roughly calculating accuracy of one of a vertical and a horizontal components of a motion vector.

8. The video decoding apparatus according to claim 1, wherein the simplifying unit turns on and off a filtering process of information on a chrominance signal.

9. The video decoding apparatus according to claim 8, wherein the simplifying unit turns on and off the filtering process of the information on the chrominance signal by roughly calculating accuracy of a motion vector of the chrominance signal.

10. A video recording method for decoding a compression-encoded video stream, comprising:
  generating one of an intra prediction image and an inter prediction image from the video stream and decoded images thereof based on an encoding mode of an object to be decoded;
  generating a residual decoded image from the video stream based on a quantization parameter of the object to be decoded;
  generating a decoded image by adding the one of an intra prediction image and an inter prediction image generated by the prediction decoding unit to the residual decoded image generated by the residual decoding unit;
  applying deblocking filter process for reducing a block distortion onto the decoded image generated by the adding unit;
  determining whether or not a current processing load is higher than a threshold value;
  if it is determined that the current processing load is higher than the threshold value, extracting information on an encoding mode from the video stream to determine, based on the extracted information, whether to simplify an inter prediction process for generating the inter prediction image; and
  gradually simplifying the inter prediction process based on a determination result of the determining unit, wherein
  the threshold value is an average value of objects to be decoded in decoded past pictures or slices, or a value obtained by adding an offset value to the average value, and
  wherein the object to be decoded uses percentages of B slices in loop processing in units of slices and of B slices in loop processing in units of pictures, and percentages of bi-prediction macro-blocks in loop processing in units of macro-blocks and of bi-prediction macro-blocks in loop processing in units of pictures or slices.

\* \* \* \* \*